United States Patent [19]

Franken

[11] Patent Number: 4,741,541
[45] Date of Patent: May 3, 1988

[54] SEAL FOR A ROTATABLE PIPE COUPLING

[75] Inventor: Wouter A. G. Franken, La Turbie, France

[73] Assignee: Single Buoy Moorings Inc., Marly, Switzerland

[21] Appl. No.: 97,311

[22] Filed: Sep. 14, 1987

Related U.S. Application Data

[63] Continuation of Ser. No. 892,425, Aug. 4, 1986, abandoned.

[30] Foreign Application Priority Data

Aug. 9, 1985 [NL] Netherlands ............... 8502217

[51] Int. Cl.⁴ .................. F16J 15/32; F16J 15/34; F16L 17/03
[52] U.S. Cl. ....................... 277/26; 277/83; 277/95; 277/167.5; 277/206 R; 285/98; 285/111; 285/187; 285/281; 285/336
[58] Field of Search ............ 277/26, 83, 95, 177, 277/207 A, 205, 172, 206 R, 167.5; 285/111, 112, 336, 187, 98, 281; 384/482; 441/5

[56] References Cited

U.S. PATENT DOCUMENTS

| | | | |
|---|---|---|---|
| 2,512,883 | 6/1950 | Warren | 277/206 R X |
| 2,542,701 | 2/1951 | Press . | |
| 2,547,185 | 4/1951 | Von Bolhar | 277/206 R X |
| 2,643,140 | 6/1953 | Scheiwer | 285/112 X |
| 3,184,246 | 5/1965 | Kline | 277/206 R X |
| 3,285,615 | 11/1966 | Trbovich | 277/206 R X |
| 3,341,212 | 9/1967 | Bagnard et al. | 277/206 R |
| 3,449,029 | 6/1969 | Smith | 384/482 |
| 3,838,718 | 10/1974 | Flory et al. | 441/5 X |
| 3,851,888 | 12/1974 | Limpson, Jr. et al. | 277/206 R |
| 4,410,189 | 10/1983 | Myers et al. | 277/205 X |

FOREIGN PATENT DOCUMENTS

| | | | |
|---|---|---|---|
| 18636 | 5/1914 | France . | |
| 1063620 | 5/1954 | France . | |
| 1355704 | 2/1964 | France | 277/177 |
| 814265 | 6/1959 | United Kingdom | 277/206 R |
| 822121 | 10/1959 | United Kingdom | 277/206 R |

Primary Examiner—Allan N. Shoap
Attorney, Agent, or Firm—Young & Thompson

[57] ABSTRACT

Seal for a rotatable pipe coupling of large dimensions such as the swivel of a mooring device, comprising a sealing ring (30) of substantially rectangular cross-section (31) place in a rectangular groove (29) which bridges the gap (27) to be sealed, the sealing ring (30) being placed in the groove (29) in a manner such that it can expand or contract by temperature variations inside the groove (29). This can be achieved by providing radial clearance (34) between the inner face of the ring (30) and the opposite wall (28) of the (29) and/or clearance (35) between the ring (30) and the outer wall of the groove.

5 Claims, 1 Drawing Sheet

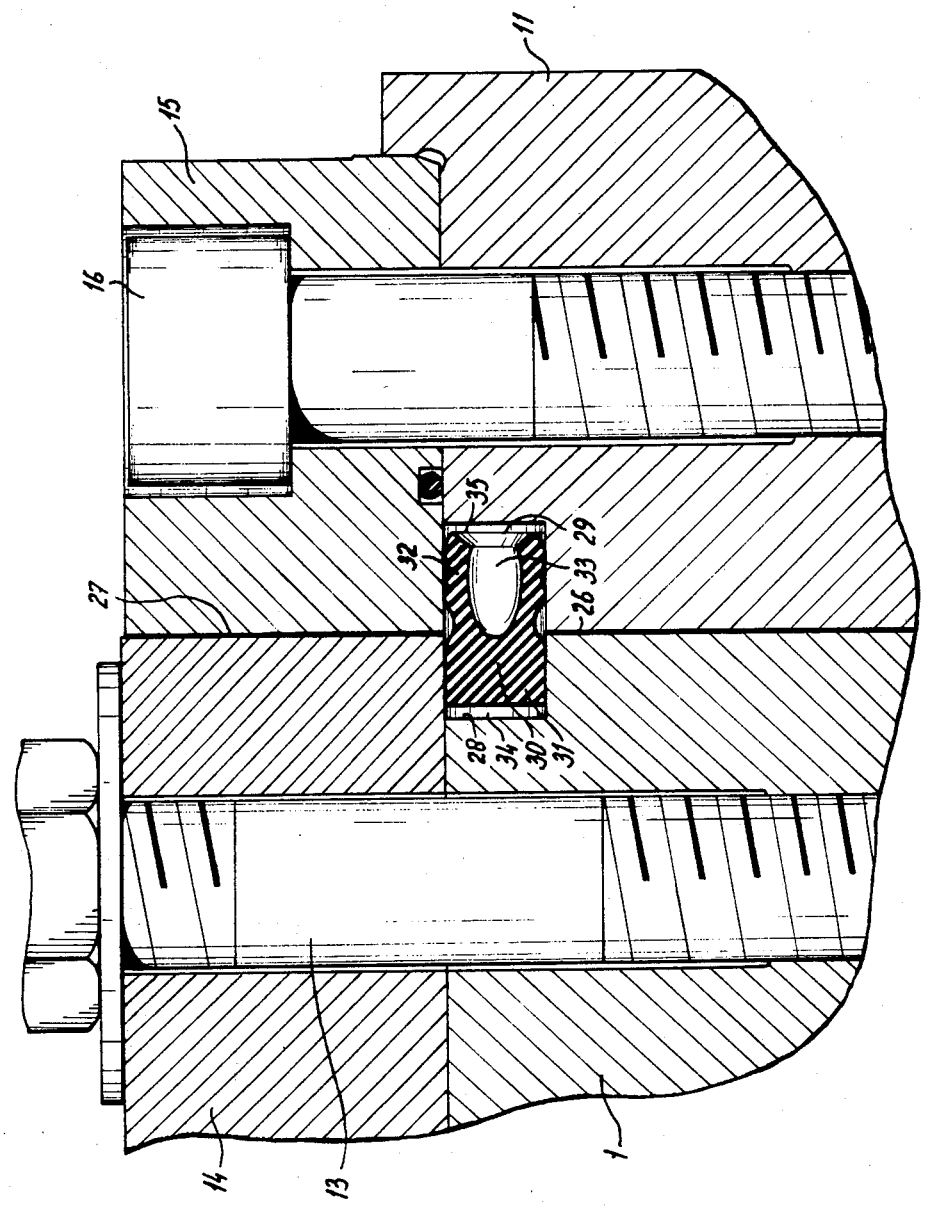

SEAL FOR A ROTATABLE PIPE COUPLING

This application is a continuation of application Ser. No. 892,425, filed 8/4/86, now abandoned.

This invention relates to a seal for a rotatable circular groove of rectangular cross-section in the surface of at least one of the faces which lie opposite one another and which are to be sealed with respect to each other, said sealing ring closing the gap between these faces and being sealingly guided on the side surface of the groove which are at right angles to the centre line of the coupling.

Rotatable pipe couplings, such as are used in mooring apparatus, are usually of large dimensions, which means that the bearings and sealing rings have a large diameter. They are used for sealing against media under high pressure, such as crude oil or gas which is to be conveyed through the coupling. Large temperature differences of the order of 200° C. may then occur.

With these sealing rings the problem now arises that, because of the difference in the coefficients of expansion between the material of the seal and the steel surrounding it, the material of the ring is pressed or extruded into the gap to be sealed, this being due to temperature differences but also to differences in pressure. This then gives rise to damage to the ring, followed by the leaking of the seal. Wear may also occur as the result of thermal stresses.

The invention seeks to provide a seal in which these problems do not occur.

According to the invention, this aim is firstly achieved in that the ring is disposed in the groove in such a manner that it can adapt to temperature variations in the plane of the ring. This can be achieved, inter alia, through clearance both on the inner side and on the outer side of the sealing ring.

It is thereby ensured that the expanding ring can first of all undergo an enlargement of its diameter and, if this is not sufficient, it can bend undulatingly in the peripheral direction, while still remaining in sealing contact with the side walls of the groove. The ring is preferably so constructed that it has a shoulder which is rectangular in section and is turned towards the centre line and which has outwardly facing, divergent elastic lips lying against the side walls of the groove. These lips spread out when the pressure of the medium to be sealed is exerted between them. It is also possible for the sealing ring to be so constructed that the lips lie under initial stress against the side surfaces of the groove, since it is now possible to use a material which is not or is only slightly viscoelastic.

With the invention it is ensured not only that the shortcoming mentioned above is avoided, but also that the parts which are to be sealed with respect to one another can be made with larger tolerances. This lower precision means a saving of costs.

The invention will now be explained more fully with the aid of the drawing, which shows schematically in section a part of a pipe coupling according to the invention.

The coupling shown consists of the stationary part 1 and the rotatable part 11.

On the top of the part 1 a ring 14 is clamped fast by bolts 13, said ring 14 cooperating with a ring 15 which is fastened by means of bolts 16 on the rotatable part 11.

The gap which is to be sealed is situated between the parts 1 and 11 at 26 and between the rings 14 and 15 at 27. The chamber 29, which extends over the gap 26 which s to be sealed, contains a sealing ring 30 which has a rectangular shoulder part 31 and lips 32 with a gap 33 between them. This sealing ring is disposed in the chamber 29 with clearance 34 on the inwardly facing side and with clearance 35 between the ends of the lips and the end wall of the chamber.

If the temperature rises, the sealing ring 30 can expand in the radial direction, that is to say in the plane of the ring. This will first of all lead to an enlargement of the diameter, so that the ends of the lips 32 will then come into contact with the surfaces facing them. On further expansion an undulating line will be formed in the peripheral direction, this being permitted by the clearance existing on the inner side of the sealing ring.

The seal according to the invention cannot now be pressed into the gap 26, 27 as the result of thermal expansion, and therefore has a longer life. The parts which are rotatable with respect to one another and which form the gaps 26 and 27 can be made with reduced precision. Small deviations in the width of the gap to be sealed are now of less importance.

The lips 32 can also be disposed in the chamber 29 under initial stress, that is to say the thickness of the unstressed rings in the lip portions before they are fitted in position is greater than that of the shoulder portion.

Whereas in known seals a viscoelastic material was desirable in order to permit good seating of the seal, although this entailed the disadvantage of limited life under high pressure because of the extrusion of the ring into the gap to be sealed, it is now possible to use a material which is not or is only slightly viscoelastic and nevertheless achieve a troublefree seal with a single ring.

The sealing ring may also be clamped without clearance on the inner edge 28 of the groove. If expansion occurs, the clamping stress will then be reduced. In the event of shrinkage, the stress will be increased. However, the contact made between the lips 32 and the side walls will remain practically unchanged.

I claim:

1. A pipe coupling comprising a pair of relatively rotatable members disposed one within the other with cylindrical faces which lie opposite one another to form a first gap, said coupling comprising a radially inner member and a radially outer member, the radially inner member having a radially outwardly opening groove that communicates and registers with a radially inwardly opening groove in the radially outer member, a pair of relatively rotatable rings disposed one within the other with cylindrical faces that lie opposite one another to form a second gap, means releasably clamping the radially outer ring to said radially outer member and the radially inner ring to said radially inner member, and a sealing ring disposed in both said grooves, each groove having radially extending opposing side walls located on one side on said members and on the other side on said rings with an end wall therebetween, said sealing ring having a shoulder which is rectangular in cross section and is sealingly guided between said radially extending side walls of the groove in the radially inner member, said sealing ring having radially outwardly extending elastic lips that are disposed at least in part in the groove in the radially outer member and bridge said gaps, said lips lying against said radially extending side walls of said groove in the radially outer member, said sealing ring being so disposed in the grooves to adapt itself to temperature variations by movement of the sealing ring in its own plane, the sealing ring extending on each radial side of said gaps a distance which is a plurality of times greater than the radial width of said gaps.

2. A structure as claimed in claim 1, in which the radial extent of the sealing ring is less than the distance between said end walls of said grooves.

3. A structure as claimed in claim 2, in which said inner member is fixed and said outer member rotates thereabout, there being clearance between said shoulder and said end wall of said groove in said radially inner member.

4. A structure as claimed in claim 1, in which said lips are in compression between said side walls of said groove in said radially outer member.

5. A structure as claimed in claim 1, in which said gaps are in alignment with each other on opposite sides of said sealing ring.

* * * * *